US010545834B1

(12) United States Patent
Smith

(10) Patent No.: US 10,545,834 B1
(45) Date of Patent: Jan. 28, 2020

(54) SERVER-ASSISTED NETWORK DATA ARCHIVING

(71) Applicant: June B. Smith, Baltimore, MD (US)

(72) Inventor: June B. Smith, Baltimore, MD (US)

( * ) Notice: Subject to any disclaimer, the term of this patent is extended or adjusted under 35 U.S.C. 154(b) by 0 days.

(21) Appl. No.: 15/910,746

(22) Filed: Mar. 2, 2018

(51) Int. Cl.
*G06F 11/14* (2006.01)
*G06F 3/06* (2006.01)

(52) U.S. Cl.
CPC .......... *G06F 11/1464* (2013.01); *G06F 3/067* (2013.01); *G06F 3/0644* (2013.01); *G06F 11/1469* (2013.01)

(58) Field of Classification Search
None
See application file for complete search history.

(56) References Cited

U.S. PATENT DOCUMENTS

| 5,764,972 | A | | 6/1998 | Crouse et al. |
| 5,966,730 | A | * | 10/1999 | Zulch ................. G06F 11/1461 707/999.202 |
| 6,543,004 | B1 | | 4/2003 | Cagle et al. |
| 6,839,740 | B1 | * | 1/2005 | Kiselev ................ G06F 3/0607 709/214 |
| 6,883,110 | B1 | | 4/2005 | Goddard |
| 7,240,219 | B2 | | 7/2007 | Teicher |
| 7,596,713 | B2 | | 9/2009 | Mani-Meitav et al. |
| 7,783,604 | B1 | | 8/2010 | Yueh |
| 7,949,635 | B1 | | 5/2011 | Korshunov et al. |
| 8,041,677 | B2 | | 10/2011 | Sumner et al. |
| 8,370,532 | B1 | * | 2/2013 | Gilbert .................. G06F 3/0605 710/15 |
| 8,510,846 | B1 | | 8/2013 | Gunnarson et al. |
| 9,176,826 | B1 | | 11/2015 | Smith |

(Continued)

OTHER PUBLICATIONS

"Direct-attached storage," Wikipedia, the free encyclopedia, available on or before May 15, 2009, last modified Apr. 21, 2017, [retrieved Apr. 6, 2018], retrieved from URL: <https://en.wikipedia.org/wiki/Direct-attached_storage>, 2 pages.

(Continued)

*Primary Examiner* — Jared I Rutz
*Assistant Examiner* — Marwan Ayash
(74) *Attorney, Agent, or Firm* — Fish & Richardson P.C.

(57) ABSTRACT

Techniques for archiving data over a local area network, including methods, systems, that apparatus that include machine-readable media for storing executable instructions. In some implementations, an apparatus includes a touch screen, one or more processors, a battery, non-volatile data storage device, and machine-readable media including executable instructions for performing data archiving operations. Communication with a network device connected to a local area network is established. Configuration data is obtained from the network device. The configuration data identifies one or more source devices connected to the network device over a local area network, and characteristics of the one or more source devices. A set of backup parameters are determined. An instruction is generated. The instruction specifies one or more archiving operations that, when received by the network device, cause the network device to extract data from the one or more source devices over the local area network.

20 Claims, 6 Drawing Sheets

(56) References Cited

U.S. PATENT DOCUMENTS

| | | | |
|---|---|---|---|
| 9,384,098 B1 | | 7/2016 | Smith |
| 10,083,095 B1* | | 9/2018 | Chopra .............. G06F 11/1464 |
| 2003/0018657 A1 | | 1/2003 | Monday |
| 2005/0253554 A1 | | 11/2005 | diFazio |
| 2009/0048853 A1 | | 2/2009 | Hall |
| 2009/0254593 A1* | | 10/2009 | Halim ................. G06F 11/1461 |
| 2009/0276475 A1 | | 11/2009 | Ramsey |
| 2009/0319736 A1 | | 12/2009 | Otani et al. |
| 2010/0077160 A1* | | 3/2010 | Liu ....................... G06F 3/0482 |
| | | | 711/162 |
| 2012/0278796 A1 | | 11/2012 | Sandlin et al. |
| 2012/0330888 A1 | | 12/2012 | Cruz |
| 2013/0086345 A1 | | 4/2013 | Endoh |
| 2013/0173556 A1* | | 7/2013 | Grigg ................. H04L 67/1095 |
| | | | 707/667 |
| 2013/0205292 A1 | | 8/2013 | Levijarvi |
| 2014/0046900 A1* | | 2/2014 | Kumarasamy .... G06F 17/30575 |
| | | | 707/620 |

OTHER PUBLICATIONS

"Directory (computing)," Wikipedia, the free encyclopedia, available on or before Mar. 10, 2012, last modified Feb. 16, 2015, [retrieved Apr. 6, 2015], retrieved from URL: <http://en.wikipedia.org/wiki/Directory_(computing)>, 3 pages.

"Disk partitioning," Wikipedia, the free encyclopedia, available on or before Sep. 25, 2004, [retrieved Apr. 6, 2015], retrieved from URL: <http://en.wikipedia.org/wiki/Disk_partitioning>, 8 pages.

"External storage," Wikipedia, the free encyclopedia, available on or before Feb. 11, 2013, [retrieved Apr. 6, 2015], retrieved from URL: <http://en.wikipedia.org/wiki/External_storage>, 4 pages.

"iPod Nano User Guide," Apple Inc., ©2011, Oct. 4, 2011, 66 pages.

"LAN-free backup," Wikipedia, the free encyclopedia, available on or before Jul. 11, 2007, last modified Dec. 14, 2017, [retrieved Apr. 6, 2018], retrieved from URL: <https://en.wikipedia.org/wiki/LAN-free_backup>, 1 page.

"Network Backup & Restore Software Solution for SMBs," Ferro Backup System™, available on or before Oct. 17, 2017 via Wayback Internet Archive, downloaded from the internet on Apr. 6, 2018, https://www.ferrobackup.com, 2 pages.

"Network Backup & Restore Software Solution for SMBs," Ferro Backup System™, available on or before Mar. 25, 2016 via Wayback Internet Archive, downloaded from the internet on Apr. 6, 2018, https://www.ferrobackup.com/how.html, 3 pages.

"Network-attached storage," Wikipedia, the free encyclopedia, last modified Mar. 14, 2018, [Retrieved on Apr. 6, 2018], https://en.wikipedia.org/wiki/Network-attached_storage, 5 pages.

"Nexto ND-2725 video backup: has Sean Penn met his match?," Dec. 10, 2008, [Retrieved on Apr. 6, 2015], http://www.engadget.com/2008/12/10/nexto-nd-2725-video-backup-has-sean-penn-met-his-match/, 2 pages.

"Storage area network," Wikipedia, the free encyclopedia, last modified Mar. 23, 2018, [Retrieved on Apr. 16, 2018] https://en.wikipedia.org/wiki/Storage_area_network, 10 pages.

Frequently Asked Questions, Barracuda Backup, available on or around Feb. 3, 2017 via Wayback Internet Archive, downloaded from the internet on Apr. 6, 2018, https://www.barracuda.com/products/backup/faq, 5 pages.

Galbraith, "Find the right backup drive for your storage needs," PCWorld, Dec. 6, 2013, [Retrieved on Apr. 16, 2018], http://www.pcworld.com/article/2069900/find-the-right-backup-drive-for-your-storage-needs.html, 5 pages.

"iPod Classic User Guide," Apple Inc., Sep. 9, 2008, [retrieved May 1, 2018], retrieved from URL: <https://manuals.info.apple.com/MANUALS/0/MA630/en_US/iPod_classic_120GB_en.pdf>, 76 pages.

"iPod Touch User Guide," Jun. 2013, [retrieved on May 1, 2018], retrieved from URL: <https://manuals.info.apple.com/MANUALS/1000/MA1657/en_US/ipod_touch_ios6_user_guide.pdf>, 138 pages.

"My Cloud™ Personal Cloud Storage Product Overview," available on or before Nov. 26, 2013, via Internet Archive: Wayback Machine URL <https://web.archive.org/web/20131126041410/http://www.wdc.com/wdproducts/library/AAG/ENG/4178-705970.pdf>, [retrieved Sep. 2013], retrieved from URL: <http://www.wdc.com/wdproducts/library/AAG/ENG/4178-705970.pdf>, 2 pages.

Posey, Brian, "Data backup and storage networking basics: Why back up network hardware?," SearchDataBackup, TechTarget Network, available on or before Jun. 5, 2011, via Internet Archive: Wayback Machine URL: <https://web.archive.org/web/20110605120344/https://searchdatabackup.techtarget.com/tip/Data-backup-and-storage-networking-basics-Why-back-up-network-hardware>, [retrieved on Apr. 6, 2018], retrieved from URL: <https://searchdatabackup.techtarget.com/tip/Data-backup-and-storage-networking-basics-Why-back-up-network-harware>, 6 pages.

"The Cloud-Integrated All-in-One Backup Solution, Barracuda Backup", available on or before May 9, 2014 via Internet Archive: Wayback Machine URL: <https://web.archive.org/web/20140509021537/https://www.barracuda.com/products/backup>, [retrieved Apr. 6, 2018], retrieved from URL: <https://www.barracuda.com/products/backup>, 8 pages.

"WD My Cloud Website", © 2001-2015 available on or before Apr. 6, 2015, [retrieved Apr. 6, 2015], retrieved from URL: <http://www.wdc.com/en/products/products.aspx?id=1140>, 11 pages.

"WD My Cloud™ Personal Cloud Storage User Manual", Nov. 2013, [retrieved on May 1, 2018], retrieved from URL: <http://www.wdc.com/wdproducts/library/UM/ENG/4779-705103.pdf>, 126 pages.

Notice of Allowance issued in U.S. Appl. No. 14/669,014 dated Jul. 1, 2015, 30 pages.

Office Action issued in U.S. Appl. No. 14/863,809 dated Jan. 12, 2016, 12 pages.

Notice of Allowance issued in U.S. Appl. No. 14/863,809 dated Mar. 21, 2016, 5 pages.

Office Action issued in U.S. Appl. No. 15/193,234 dated Jun. 15, 2018, 23 pages.

\* cited by examiner

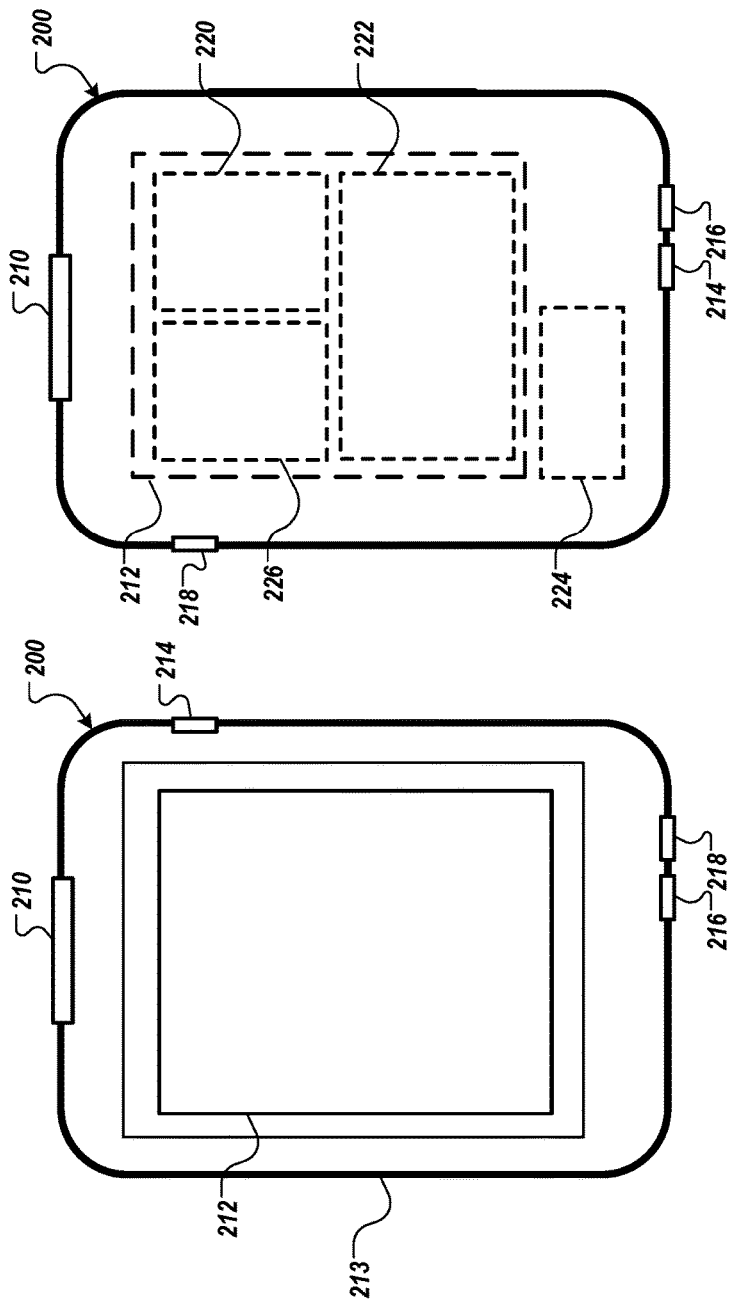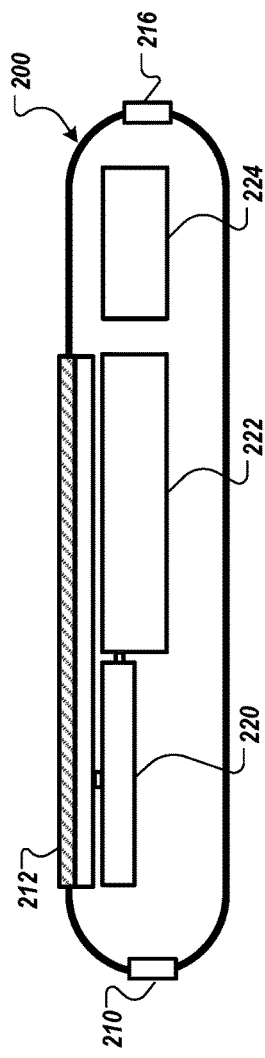

SERVER-ASSISTED NETWORK DATA ARCHIVING

TECHNICAL FIELD

This specification generally describes technology for data archiving devices.

BACKGROUND

Computers, phones, and other devices can generate large amounts of data. This data can be stored on different types of data storage devices. Many types of data storage devices record and process information. For example, hard drives and flash drives can store data. Some external storage devices allow data to be transferred between different locations or between different devices.

SUMMARY

A portable data backup device may be used to backup and restore data stored on multiple source devices connected over a local area network (LAN) so that the data may be stored on a single archiving device. The backup device can establish a communication with a network device connected to the LAN such as a server or a network router. The backup device can use the communication to obtain various types of information through the network device. For example, the backup device can discover a network configuration of the LAN, e.g., number of source devices connected over the LAN, device types of the source types, amount of data to be backed up, relationships between source devices connected over the LAN, etc. The backup device can also obtain device configurations for each of the multiple source devices, e.g., network bandwidth, total data stored, whether the stored data was recently modified, data that is accessed most recently and/or most frequently, etc.

The backup device can use communication with the network device to retrieve data to be backed up over the LAN without requiring a connection to each individual source device. For example, the backup device can transmit a backup instruction to the network device, which causes the network device to extract data to be backed up from the multiple source devices over the LAN. The backup device can retrieve the extracted data from the network device for storage in non-volatile data storage of the backup device. In some implementations, the backup device 120 is also capable of backing up data stored on the network device 120.

The backup device can use the configuration data, e.g., device configuration data, to configure its non-volatile storage to store data retrieved from multiple source devices. The backup device can assign a partition within the non-volatile storage to each source device and store data extracted within each partition. Each partition can be customized according to the device configuration of the source device, e.g., device type, operating system or file system, amount of data to be backed up, a type of backup to be performed, etc. For example, the non-volatile storage can include a larger partition for data extracted from a source device that includes an operating system image, and a smaller partition for data extracted from a source device that includes files to be backed up.

The backup device can retrieve data from the source devices and/or the network device using various retrieval techniques. For example, the backup device can retrieve data of the source devices extracted by the network device from the source devices through a direct physical connection between the backup device and the network device, e.g., universal serial bus (USB) connection. In other examples, the backup device can use network-based connections, either wired or wireless, over the LAN, to retrieve the data, e.g., a network-based connection with a source device, or a network-based connection with the network device. In some other examples, the backup device can use a wireless connection with the network device that is independent of the LAN, e.g., a secured proximity-based connection.

Once data from the source devices and/or the network device is retrieved by the backup device, the backup device can store backup data of the network device and the source devices connected over the LAN. The backup data can include redundant image backups of the entire operating systems of each of the source devices and the network device, e.g., backups including application data, files, configuration data, among others. In some instances, the backup data includes partial backup data, such as application backups, file backups, multimedia backups, among others. The non-volatile storage of the backup device can be configured accordingly based on the size and type of backup to be performed for the source devices and/or the network device.

The backup device can perform other types of actions while in communication with the network device. For example, the backup device can update existing backup data stored in the non-volatile data storage, e.g., in response to detected file changes over the LAN, periodically at specified time points, or on demand based on receiving a user instruction to check for data updates. As another example, the backup device can run software enabling the backup device to operate as a backup server connected over the LAN when a primary server is unavailable or not operational. The backup device can run and manage the same operating system, applications, services, security settings, network configurations, etc., as the primary server. In this example, the backup device can be used to temporarily perform the operations that would be performed by the primary server, e.g., based on operating as a replacement server using the backup data for the primary server. Additionally, the backup device can be used to configure another server to replace the primary server, e.g., by performing a restoration operation on the second server based on backup data of the primary server stored on the backup device.

In one general aspect, an apparatus includes: a non-volatile data storage device, the non-volatile data storage device having a plurality of different logical data storage areas; machine-readable media including executable instructions that, when executed by the one or more processors, cause the one or more processors to perform operations. The operations include: establishing communication with a network device connected to a local area network; obtaining configuration data from the network device, the configuration data identifying (i) one or more source devices connected to the network device over a local area network, and (ii) characteristics of the one or more source devices; determining a set of backup parameters based on the obtained configuration data; generating an instruction based at least on the determined set of backup parameters, the instruction specifying one or more archiving operations that, when received by the network device, cause the network device to extract data from the one or more source devices over the local area network; transmitting the instruction to the network device; retrieving, from the network device, data extracted by the network device from the one or more source devices over the local area network in response to receiving the instruction; and storing the retrieved data at the non-volatile data storage device.

Implementations may include one or more of the following features. For example, in some implementations, the operations include: determining to perform a restoration operation for a particular source device from among the one or more source devices; determining that the stored data at the non-volatile data storage device includes backup data to be restored on the particular storage device; generating a second instruction based at least on the determined set of backup parameters, the second instruction specifying the restoration operation that, when received by the network device, cause the network device to (i) retrieve the backup data from the non-volatile data storage device, (ii) transmit the backup data to the particular source device over the local area network, and (iii) cause the backup device to execute the restoration operation based on the retrieved backup data; and transmitting the instruction to the network device.

In some implementations, the operations include: determining to perform a restoration operation for a particular source device from among the one or more source devices; determining that the stored data at the non-volatile data storage device includes backup data to be restored on the particular storage device; generating a second instruction based at least on the determined set of backup parameters, the second instruction specifying the restoration operations that, when received by the particular source device, cause the particular source device to (i) retrieve the backup data from the non-volatile storage, and (ii) execute the restoration operation based on the retrieved backup data; and transmitting, over a direct connection with the particular source device, the second instruction to the particular source device.

In some implementations, the operations include: assigning, to each of the one or more source devices, a particular logical data storage area of the non-volatile data storage device for storing data extracted by the network device from a particular source device; and storing the respective data extracted by the network device in the particular logical data storage areas assigned to each of the one or more source devices.

In some implementations, assigning the particular logical data storage area of the non-volatile data storage device to each of the one or more source devices includes, for each of the one or more source devices: determining an amount of data to be extracted by the network device; and determining a storage allocation for the particular logical data storage area of the non-volatile data storage device based on the amount of data to be extracted by the network device, the storage allocation specifying a size of the particular logical storage area of the non-volatile data storage device.

In some implementations, assigning the particular logical data storage area of the non-volatile data storage device to each of the one or more source devices includes, for each of the one or more source devices: determining operating system of the network device; and determining a storage format for the particular logical data storage area of the non-volatile data storage device based on the operating system of the network device.

In some implementations, the particular logical data storage areas of the non-volatile data storage device assigned to each of the one or more source devices includes: a first logical data storage area for storing data indicating an operating system backup image extracted from a first source device from among the one or more devices; and a second logical data storage area for storing data indicating backup files extracted from a second source device from among the one or more devices.

In some implementations, the configuration data for the network device identifies device types of each of the one or more source devices; the set of backup parameters includes a particular backup parameter that specifies a sequence by which the network device extracts the data from each of the one or more source devices over the local area network; and the operations further include determining the sequence by which the network device extracts the data from each of the one or more source devices over the local area network based on the device types of each of the one or more source devices.

In some implementations, the communication with network device is established using a wireless network connection over the local area network.

In some implementations, communication with network device is established using a secure wireless connection that is independent of the local area network.

In some implementations, the operations further include: displaying, on the touchscreen, a user interface comprising user selectable controls that permit a user to indicate data to be archived using the apparatus, and receiving, through the user interface displayed on the touchscreen, user input that indicates data extracted from the one or more source devices to be archived to the non-volatile data storage device; and retrieving the data extracted by the network device from the one or more source devices comprises retrieving, from the network device, the data indicated by the user input in response to receiving the user input through the user interface displayed on the touchscreen.

In some implementations, the non-volatile data storage device is a hard disk drive or a solid state drive.

In some implementations, establishing communication with the source device comprises establishing communication with the source device over a Universal Serial Bus connection.

In some implementations, the one or more processors include: a first processor configured to manage communications with the source device; and a second processor configured to process user input received through the touchscreen.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 2A-2C are diagrams that illustrate views of an example backup device.

DETAILED DESCRIPTION

Figure 1A:
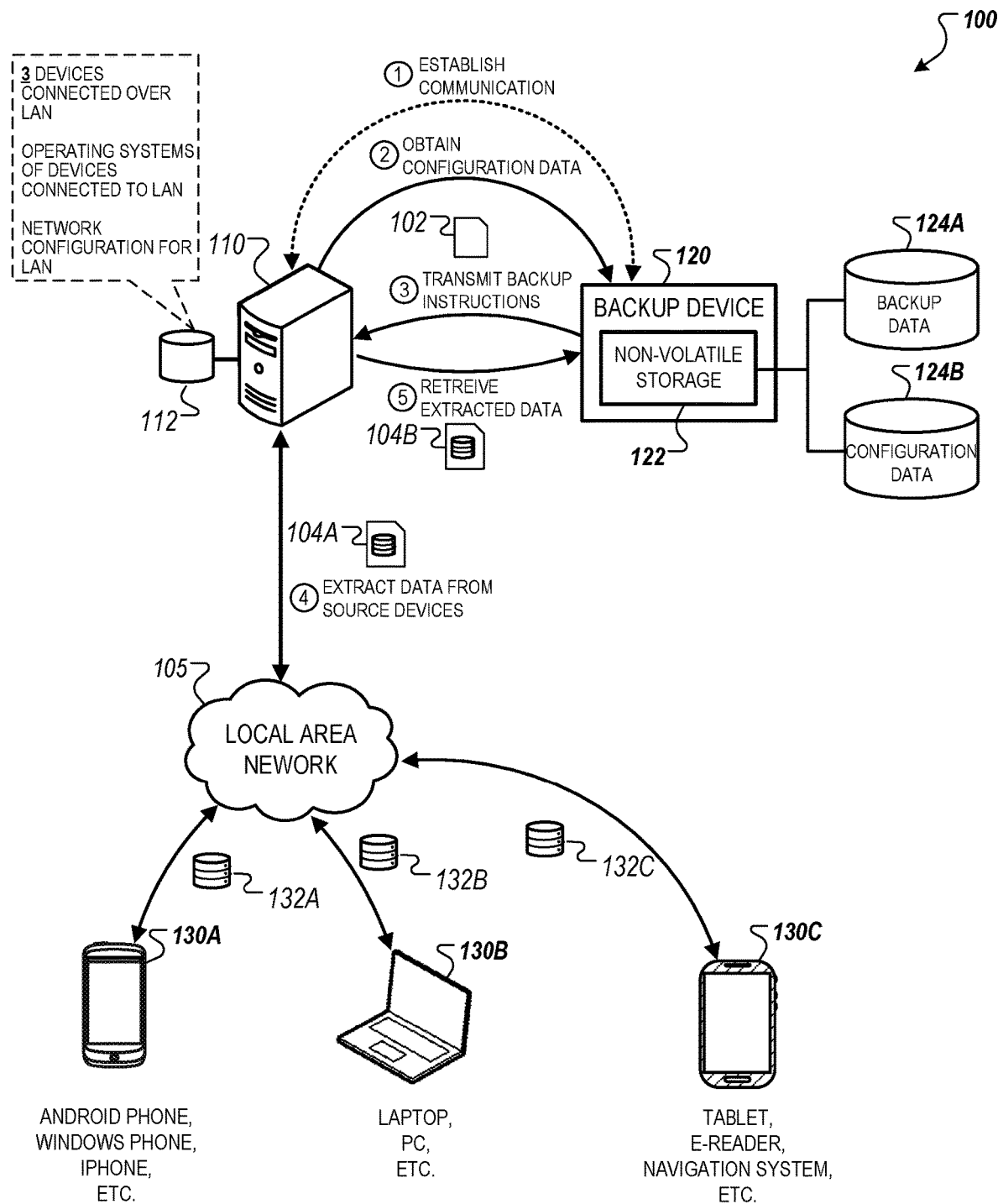
FIG. 1A is a schematic diagram that illustrates an example of a system for archiving data over a local area network.

FIG. 1A is a schematic diagram that illustrates an example of a system 100 for archiving data obtained over from source devices connected 130a, 130b, and 130c over a local area network (LAN) 105. The system 100 includes network device 110, a backup device 120, and source devices 130a-c. The source devices 130a-c are configured to communicate with the network device 110 over the LAN 105. The network device 110 further includes a storage repository 112. The backup device 120 includes non-volatile storage 122 that stores backup data 124A and configuration data 124B. The backup data 124A includes data retrieved from the source devices 130a-c, e.g., data 132a, 132b, and 132c extracted by the network device 110 over the LAN 105.

Referring briefly to the example depicted in FIG. 1A, the backup device 120 performs an archiving operation to retrieve data 132a-c of source devices 130a-c, respectively, over the LAN 105 for storage within the non-volatile storage 122. At stage (1), the backup device 120 initially establishes a communication with the network device 120. At stage (2), the backup device 120 obtains configuration data associated with source devices 130A-C and/or the LAN 105 using the established communication with the network device 110. At stage (3), the backup device 120 transmits a backup instruction 102 to the network device 110. At stage (4), the network device 110 obtains extracted data 104A, including data 132a-c stored on the source devices 130a-c, respectively, over the LAN 105. At stage (5), the backup device 120 retrieves extracted data 104B from the network device 110 for storage in the non-volatile storage 122.

Referring initially to the components of the system 100, the network device 110 can be any type of computing device with processing and storage capabilities that is capable of exchanging communications over the LAN 105. For example, in some implementations, the network device 110 is a network router that operates as a dynamic host configuration protocol (DHCP) server for the LAN 105. In such implementations, the backup device 120 establishes communications with the network router in order to obtain the configuration data 124, and identify respective network paths to access the data 132a-c stored on the source devices 130a-c. In other implementations, the network device 110 is a server (e.g., an application server, a web server, etc.) that provides a set of services that are accessed by the source devices 130a-c over the LAN 105. In such implementations, the backup device 120 may transmit instructions to the server that cause the server to extract the data 132a-c over the local network 105. The backup device, in these implementations, then retrieves the extracted data and/or other data stored on the server without requiring a connection to the source devices 130a-c and/or the LAN 105.

The network device 110 may communicate with multiple mobile and desktop operating systems such as Android, iOS, Windows and Mac using a software controller module that initially determines the device type of the source devices 130a-c. For example, the software controller of the network device 110 may read the USB port attributes of the connected source devices 130a-c to determine what operating system each source device is running. The information extracted by the network device 110 can then be transmitted to the backup device 120 to configure a backup operation as discussed below.

The backup device 120 is a portable storage device that includes a touch screen interface, an internal data storage device such as a hard drive or solid-state drive, and a communication module such as a universal serial bus (USB) connection port. As described above, the backup device 120 can establish a connection with the network device 110 through a physical connection (e.g., Ethernet connection, USB connection), or a wireless connection, initiates a data transfer, which can include transferring data stored on the network device 110 or data stored on the source devices 130a-c, e.g., data 132a-c.

The backup device 120 can archive data from many different types of devices. As represented in FIG. 1A, the source device 130a is a mobile device such as a smartphone or personal digital assistant (PDA), which can run any of a variety of operating systems, such as Android, Windows Phone, iOS, and so on. The source device 130b is a computer such as a laptop or a desktop computer which can also run any appropriate operating system, e.g., Windows, MacOS, Linux, and so on. The source device 130c represents a tablet computer, eReader device, GPS navigation system, or other device. The source devices 130a-c are shown as examples of the many different devices for which that backup device 120 archive data. For example, the backup device 120 can be capable of simultaneously storing archived data for 5, 10, or more different devices that are connected over the LAN 105.

The backup device 120 can generate a touch interface to allow a user to select archiving options. For example, a user may select a "backup" option to create a recovery partition on the hard drive of the backup device 120, or select a "restore" option to copy files previously backed up on the hard drive onto the source device 110a. The backup device 120 can determine the amount of data to be backed up based on the input provided through the user interface. For example, a user may select an option to backup all data from the source device 110a or select an option to backup only selected files from the source device 110a. The backup device 120 then verifies that sufficient space is available on the hard drive of the backup device 120 to allow the specified archiving option.

The backup device 120 may also perform data processing techniques after initiating the archiving process such as error handing routines for unknown or unsupported file types, recovery routines for interrupted archiving processes, data decryptions for encrypted data, file compressions or decompressions, or repartitioning data on the hard drive of the backup device 120 to create space for archived data from the source device 110a.

Referring now in more detail to the example depicted in FIG. 1A, at stage (1), the backup device 120 initially establishes a communication with the network device 120. The communication can be established using a wired network-based connection protocol (e.g., Ethernet, user datagram protocol (UDP), transmission control protocol (TCP), etc.) or a wired connection protocol, e.g., media transfer protocol (MTP), picture transfer protocol (PTP), USB mass storage, etc. Alternatively, the communication can also be established using a wireless network-based connection protocol (e.g., Wi-Fi), or a proximity-based wireless connection protocol (e.g., Bluetooth, near-field communication (NFC), infrared, Z-wave, ZigBee, etc.).

The established communication enables, for example, the backup device 120 to exchange data packets with the network device 110 in relation to a data archiving operation. For example, as depicted in FIG. 1A, the established communication enables the backup device 110 to transmit a backup instruction 102 to the processing unit 110 that causes the network device 110 to extract data 132*a*, 132*b*, and 132*c* respectively from the source devices 130*a*, 130*b*, and 130*c* over the LAN 105. Extracted data 104A, which can include data 132*a*, 132*b*, 132*c* as well as data stored on the network device 110, is transmitted to the backup device 120 over the established communication. The backup device 120 archives the extracted data 104A within one or more partitions of a non-volatile storage device as backup data 122. In some instances, the extracted data 104A can be temporarily stored within the storage repository 112 on the network device 110 before being transmitted to the backup device 120 for data archival.

The communication between the network device 110 and the backup device 120 can be established automatically, e.g., based on the backup device 120 being brought within a physical proximity to the network device 110. For example, the network device 110 and the backup device 120 may be capable of communicating using a short-range wireless communication link, such as a direct wireless radiofrequency (RF) communication link between the devices. Examples include wireless personal area networks, communications according to IEEE 802.15, and Bluetooth, e.g., communication using IEEE 802.15.1 protocols or other Bluetooth standards. Other types of wireless links, such as IEEE 802.11 or WI-FI communication, may additionally, or alternatively, be used. In some implementations, a direct communication link between the network device 110 and the backup device 120 is used and signal strength over the wireless communication link is used as an indicator of distance between the devices.

Alternatively, the communication can be established after the connection between the network device 110 and the backup device 120 has been verified. For example, the backup device may present a security token to gain access to the network device 110. In this example, the network device 110 can run an application that verifies the presented security token to determine, for example, if a user has authorized the backup device 120 to obtain access to data stored on the source devices 130*a*-*c* over the LAN 105. In some other examples, once the network device 110 has connected to the backup device 120, a user interface can be presented on the network device 110 and/or the backup device 120 to request a user to provide an access code that verifies the connection.

At stage (2), the backup device 120 obtains configuration data 124B of source devices 130A-C and/or the LAN 105 using the established communication with the network device 110. The configuration data 1248 can identify network information for the LAN 105, e.g., internet protocol (IP) addresses of connected source devices, media access control (MAC) addresses of connected source devices, among other types of network configuration data. The configuration data 124B can also identify the number of source devices connected over the LAN 105, and types of network connections associated with each of the source devices 130A-C. The configuration data 1248 can also identify various types of network performance attributes associated with the LAN 105 such as the total available bandwidth, upload and/or download speeds, or network latency. These parameters can be determined for each device in the LAN 105, and for each link between devices. Additionally, the configuration data 124B can include both present network data as well has historical network data collected over a specified period of time. For example, the historical network data can include a history of network usage over the specified period of time that identifies time periods when network usage is low on the source devices 130*a*-*c*.

Additionally, the configuration data 124B can include obtain other types of data such as device configuration data for each of the source devices 130A-C. The device configuration data can specify a device type of each source device, e.g., mobile phone, network computing device, tablet computing device, an operating system running on each source device, e.g., iOS, Android, Windows, etc., and/or a type of backup to be performed for data stored on each source device, e.g., an operating system backup, file system backup, etc.

In some implementations, the device configuration data provides usage information for data files to be backed up using the backup device 120. Examples of such usage information include information that identifies files that have been recently updated on the source devices, e.g., files that have been updated since the last backup over the LAN 105. The usage information can also identify files that are most frequently accessed by users, e.g., executable files for programs that are frequently run on a source device, among others. The usage information can also specify a list of files stored on each hard drive of the source devices, e.g., a list that includes timestamps identifying when the files were created, modified, and/or last accessed by a user. In such implementations, the device configuration data can be used by the backup device 122 to periodically scan for updates to files and automatically determine, e.g., without user intervention, to initiate a backup operation if certain associated conditions and/or triggers have been satisfied. For example, the backup device 120 may automatically initiate a backup operation over the LAN 105 if the number of files that have been recently adjusted exceeds a threshold value. In this example and others, the backup device 120 may be capable of automatically initiating an archiving operation when it is constantly connected to the network device 110 or, alternatively, when it initially establishes communication with the network device 110 after being disconnected.

The configuration data 124B can either be stored locally on the network device 110, or extracted over the LAN 105. For example, in some implementations, the network device 110 runs an application associated with the backup device 120 that periodically collects the configuration data 124B and stores the collected data in the repository 112. In such implementations, the backup device 120 obtains the configuration data 1246 by accessing the stored contents of the repository 112 after establishing communication with the network device 110. In other implementations, the network device 110 extracts the configuration data 1248 (and other types of data) in response to receiving an instruction to obtain such data from the back up device 120.

At stage (3), the backup device 120 transmits a backup instruction 102 to the network device 110. The backup device 120 generates the instruction 102 based on the configuration data 124B and other types of data obtained using the communication with the network device 110. For example, the instruction 102 can include commands that cause the network device 110 to extract data 132A-C from the source devices 130A-C based on configuration data 124B identifying the source devices and the data stored on each of the source devices.

The instruction 102 can also specify device-specific archiving operations to be performed by the network device 110 for each source device. For example, the instruction 102 can specify the operating system backup for the source device 130A, and a data file backup for the source device 1308. In this example, the instruction 102 can include executable files that cause the network device 110 to perform the specified archiving operations specific to each source device.

In some implementations, the instruction 102 can specify a prioritization that causes the network device 110 to extract data from the source devices 130A-C over the LAN 105 according to a specified order. As discussed below, the prioritization can be based on, for example, the amount of data to be backed up on each source device, the device type of each source device, frequency of use or importance of data that is stored on each device, among others. As an example, the prioritization can specify the extraction of data stored on the source device 130B prior to the extraction of data stored on the source device 130A because the source device 130B is a laptop computing device that is likely to store a larger amount of important data compared to the source device 130A, which is a smartphone. In another example, the prioritization can be used to specify more frequent backups of essential data, e.g., system configuration files, compared to non-essential data, e.g., personal files that the user has indicated as not being important.

At stage (4), the network device 110 obtains extracted data 104A, including data 132a-c stored on the source devices 130a-c, respectively, over the LAN 105. The network device 110 can use different extraction techniques over the LAN 105 to obtain the data 132A-C. In some implementations, the network device 110 executes network access queries that initiates data transfer from a source device to the network device 110 over a network path on the LAN 105, e.g., data transfer over a shared network drive. In such implementations, the data transfer can be initiated automatically, e.g., without human intervention, using executable instructions that cause network device 110 to extract data from a target storage device of the source device over the LAN 105.

In some implementations, where the network device 110 is physically connected to the source devices, e.g., through a USB connection, the network device 110 can extract data from source devices using a wired connection protocol, e.g., media transfer protocol (MTP), picture transfer protocol (PTP), USB mass storage, etc.

The network device 110 can obtain the extracted data 104A based on the network attributes associated with the LAN 105. For example, the network device 110 may extract the data 104A at specified time points when the LAN 105 is expected to have high total available bandwidth, e.g., at 3 AM when the number of active connections over the LAN 105 is limited. In another example, the network device 110 can adjust, for example, the download speed of data transfer over the LAN 105 while performing an archiving operation, to reduce the overall network performance impact on the LAN 105 as a result of performing the archiving operation. In this example, the network device 110 performs the archiving operation in a manner that minimizes the impact on other devices that are actively connected to the LAN 105, e.g., other source devices, or other devices that are not being backed up.

In addition, the network device 110 may obtain data from multiple source devices sequentially or in parallel over the LAN 105. In some instances, the network device 110 obtains data from multiple source devices in parallel by running multiple data transfer queries to reduce the overall time required to perform an archiving operation of the multiple source devices. Alternatively, in other instances, the network device 110 obtains data from multiple sources sequentially, e.g., according to a backup prioritization, to minimize the adverse impacts of the archiving operation on network performance attributes such as network latency, bandwidth consumption, among others.

In some implementations, the network device 110 is capable of dynamically adjusting the particular extraction technique used to obtain the data 104A based on, for instance, the present network conditions of the LAN 105. In such implementations, the network device 110 determines the present network conditions of the LAN 105 prior to performing an archiving operation specified by the instruction 102. The network device 120 then selects a particular extraction technique based on the determined network conditions. For example, the network device 110 may use a high-speed, high network bandwidth extraction technique if the LAN 105 has no active connections. In other instances, the determination of which extraction technique to use can be based on the device status of the source device to be backed up. For example, the network device 110 can use a high-speed extraction technique if a source device is determined to be inactive, e.g., not presently being used by a user, and use a low-speed extraction technique if the source device is not presently being used by a user.

At stage (5), the backup device 120 retrieves extracted data 104B from the network device 110 for storage in the non-volatile storage 122. In some implementations, the backup device 120 retrieves the extracted data 104B using the communication with the network device 110 while the network device 110 obtains the extracted data 104A over the LAN 105. For instance, the backup device 120 can obtain the extracted data 104B as individual data packets that include portions of extracted data 104 while the network device 110 conducts an ongoing extraction operation. As an example, the backup device 120 can obtain data packets including data 132A (which were already extracted by the network device 110) while the network device 110 extracts data 132B over the LAN 105. In this regard, the backup device retrieves the extracted data 104B incrementally, e.g., as data packets, while the network device 110 performs an extraction operation over the LAN 105.

In other implementations, the backup device 120 uses the network device 110 as a conduit device to obtain the extracted data 104B. For example, the backup device 120 can use the processing and/or computing capabilities of the network device 110 to extract and retrieve the extracted data 104B over the LAN 105. In this example, the network device 110 can run an application that runs executable instructions provided by the backup device 120 to obtain and transfer the extracted data 104B from the source devices 130A-C to the non-volatile storage 122 of the backup device 122.

In some other implementations, the backup device 120 can obtain the extracted data 104B once the network device 110 has completed the extraction operation over the LAN 105. For example, the network device 110 can temporarily store the extracted data 104A in a storage device such as the repository 112. In this example, the backup device 120 retrieves the extracted data 104B from the repository 112 after, for instance, the network device 110 has completed the extraction of data to be backed up from a source device, e.g., after the network device 110 completes extracting data 132A from the source device 130A and storing data 132A in the repository 112.

Once retrieved, the backup device 120 stores the extracted data 104B in the non-volatile storage 122 as backup data 124B. The backup data 124B can be segmented and stored in different partitions of the non-volatile storage 122. The backup device 120 can assign a partition to each source device such that data extracted from a source device is stored in a partition assigned to the source device. For example, the backup device 120 can store a first portion of the retrieved data 104B corresponding to the data 132A in a first partition assigned to the source device 130A, a second portion of the retrieved data 104B corresponding to the data 1326 in a second partition assigned to the source device 1306, and a third portion of the retrieved data 104B corresponding to the data 132C in a third partition assigned to the source device 130C.

The backup device 120 can configure each partition based on data obtained from the network device 110 in stage (2). For example, the backup device 120 can configure each partition based on device and/or network information for a source device, e.g., device type, operating system, total amount of data stored, type of backup to be performed, etc. In this regard, the non-volatile storage 122 can include multiple different partitions of different formats, different sizes, and/or different access/retrieval specifications.

Figure 1B:
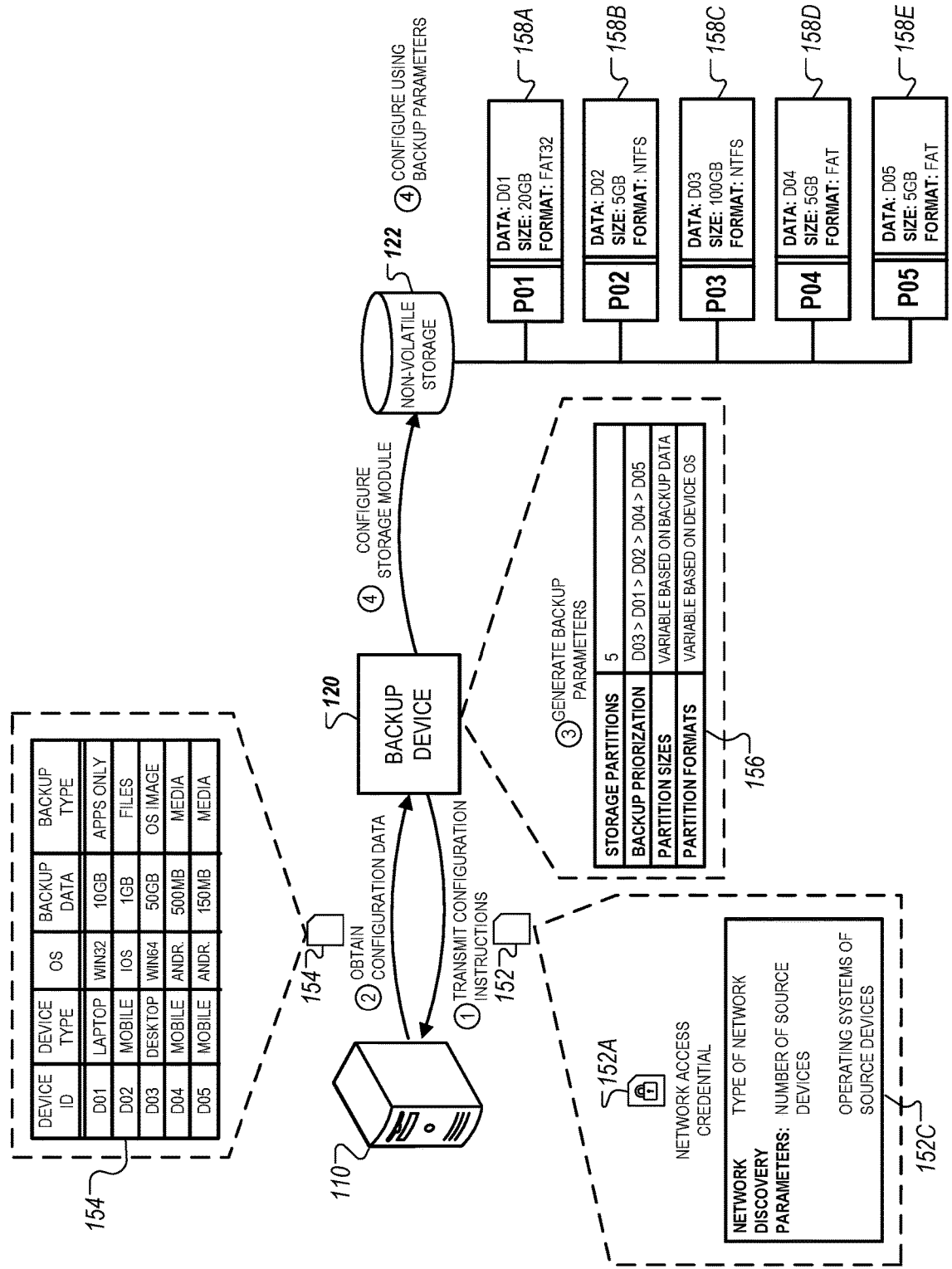
FIG. 1B is a schematic diagram that illustrates an example of a process for configuring non-volatile storage device based on configuration data for a local area network.

FIG. 1B is a schematic diagram that illustrates an example of a process for configuring non-volatile storage 122 of the backup device 120 during an archiving operation.

Referring briefly to the example depicted in FIG. 1B, the backup device 120 partitions the non-volatile storage 122 for archiving data retrieved from and/or through the network device 110. The backup device 120 initially establishes communication with the network device 110 using techniques similar to those discussed above with respect to FIG. 1A. At stage (1), the backup device 120 transmits a configuration instruction 152 to the network device 110 to establish communication. At stage (2), the backup device 120 obtains configuration data 152 from the network device 110 using the established communication. At stage (3), the backup device 120 generates a set of backup parameters 156 based on the obtained configuration data 154. At stage (4), the backup device 120 configures the non-volatile storage 122 using the set of backup parameters 156. Once configured, the backup devices 120 stores extracted data from source devices in the different partitions of the non-volatile storage 122.

In more detail, at stage (1), the backup device 120 initially transmits the configuration instruction 152 to the network device 110. In this example, transmission of the configuration instruction 152 allows the backup device 120 to initiate a communication with the network device 110 and provide instructions to the network device 110 to extract data from source devices over a local area network such as the LAN 105 depicted in FIG. 1A. For example, the configuration instruction 152 includes a network access credential 152*a* that can be used to ensure that a communication between the backup device 120 and the network device 110 is secure and authorized. The configuration instruction 152 additionally includes network discovery parameters 152*b*, which the network device 110 can use to extract configuration data for source devices connected over the LAN 105.

The network access credential 152*a* can be used by the network device 110 to determine if the backup device 120 should be granted access to network information associated with the LAN 105. For example, in some implementations, the network access credential 152*a* is an access code that is submitted by a user when the backup device 120 is connected to the network device 110, e.g., through a user interface presented on either the network device 110 and/or the backup device 120. In other implementations, the network access credential 152 can be a device identifier that is used by the network device 110 to determine if the backup device 120 has been authorized by a user, e.g., an information technology (IT) administrator, to archive data stored on source devices connected over the LAN 105.

The network discovery parameters 152*b* specifies a set of network information requested by the backup device 120 in order to configure the non-volatile storage 122. For instance, in the example depicted in FIG. 1B, the network discovery parameters 152*b* include a request for the type of network of the LAN 105, e.g., wireless network, wired network, etc., the number of source devices connected over the LAN 105, and operating systems of source devices connected over the LAN 105. In this example, the backup device 120 directs the network device 110 to extract network configuration information by transmitting the network discovery parameters 152B in the configuration instruction 152.

In some implementations, the configuration instruction 152 includes the network access credential 152B but not the network discovery parameters 152B. In such implementations, the network device 110 identifies information to be included within the configuration data 154 without a request for such information by the backup device 120. For example, in such implementations, the network device 110 can run a monitoring application that periodically determines network information for the LAN 105, including device configuration information associated with source devices connected over the LAN 105.

At stage (2), the backup device 120 obtains configuration data 152 from the network device 110 using the established communication. The configuration data 152 can include network information associated with the LAN 105, e.g., a number of source devices connected to the LAN 105, a bandwidth allocation over the LAN 105, present and historical network activity over the LAN 105, network credentials provided to source devices, among others. The configuration data can additionally include device information associated with source devices connected over the LAN 105, e.g., device type, operating system, total amount of data stored, etc.

In the example depicted in FIG. 1B, the configuration data 152 identifies five devices connected to the network device 110 over the LAN 105, e.g., devices "D01," "D02," "D03," "D04," "D05." The configuration data 152 also identifies device information for each device, e.g., "DEVICE TYPE," "OS," "BACKUP DATA," "BACKUP TYPE."

The information included within the network configuration 154 can be obtained using a variety of techniques. In some implementations, the information is extracted from configuration files stored on the network device 110, e.g., a network log file. In other implementations, the information can be identified and extracted by the network device 110 in response to receiving an instruction from the backup device 120, as shown in the example depicted in FIG. 1B. A shown, the backup device 120 transmits the configuration instruction 152, which causes the network device 110 to extract information for the network discovery parameters 152B included within the configuration instruction 152.

At stage (3), the backup device 120 generates a set of backup parameters 156 based on the obtained configuration data 154. The backup parameters 156 are used to configure the non-volatile storage 122 of the backup device 120 to archive data retrieved from source devices during an archiving operation. For example, the backup parameters 156 can specify a number of storage partitions, a backup prioritization, e.g., a specified order in which data is archived from multiple source devices, partition sizes assigned to each partition, and storage formats assigned to each partition.

In the example depicted in FIG. 1B, the backup parameters 156 include "STORAGE PARTITIONS," "BACKUP PRIORITIZATION," "PARTITION SIZES," and "PARTITION FORMATS." In this example, the backup parameters 156 includes five partitions for each of the five devices that are connected to the LAN 105 and indicated within the configuration data 152. The backup parameters 156 also includes a backup prioritization in which data stored on device "D03" is backed up before device "D01" and followed by data stored on devices "D02," "D04," and "D05." In this example, device "D03" is assigned the highest prioritization since it has the largest amount of data, e.g., 50 GB, and the type of backup to be performed is an operating system image, which the system determines is likely to include essential data. In contrast, data stored on the device "D05" is assigned the lowest prioritization since it has the smallest amount of data, e.g., 500 MB, and the type of backup to be performed is a media file backup, which the system determines is likely to represent non-essential files.

Additionally, the backup parameters 156 include variable partition sizes and formats based on the amount of data to be backed up on each source device and the type of operation system of each source device, respectively. In this example, the backup device 120 configures larger-sized partitions for source devices with larger amounts of data to be backed up. For instance, the backup device 120 assigns a larger-sized partition to device "D03," which has 50 GB of data to be backed up, and assigns a smaller-sized partition to device "D02," which has 1 GB of data to be backed up. The backup device 120 also creates partitions of different formats based on the type of operating system run by each source device. For example, the backup device 120 configures New Technology File System (NTFS) formatted partitions for devices "D01" and "D03," which run desktop operating systems, but configures File Allocation Table (FAT) formatted partitions for devices "D04" and "D05," which run a mobile operating systems. As another example, the backup parameters 156 specifies a different partition formats for data extracted from device "D02" than for data extracted from device "D01" because the configuration data 152 indicates that the devices run different operating systems (e.g., iOS and WIN64) and represent different device types (e.g., mobile device and laptop computing device).

At stage (4), the backup device 120 configures the non-volatile storage 122 using the set of backup parameters 156. In the example depicted in FIG. 1B, the backup device 120 creates five partitions within the non-volatile storage 122, e.g., partitions 158A, 158B, 158C, 158D, and 158E. Each partition is used to store data retrieved from a source device identified within the configuration data 152. For example, data extracted from source device "D01" is stored in partition 158A, data extracted from source device "D02" is stored in partition 158B, data extracted from source device "D03" is stored in partition 158C, data extracted from source device "D04" is stored in partition 158D, and data extracted from source device "D05" is stored in partition 158E.

The backup device 120 configures of the partitions 158A-E based on storage specifications identified within the backup parameters 156. In the example depicted in FIG. 1B, the backup device 120 configures the storage size and the storage format of each partition based on, for instance, the device type, the operating system, the backup data, and the backup type for the corresponding source device from which data is retrieved. For example, partition 158A is configured to have 20 GB of storage because the backup device 120 stores applications only in this partition. Partition 158B is configured to have 5 GB of storage because the backup device 120 stores files from a mobile device. Partition 158C is configured to have 100 GB of storage because the backup device 120 stores an image for a desktop operating system. Partitions 158D and 158E are each configured to have 5 GB of storage because the backup device 120 stores media from a mobile device. In these examples, the format of the partitions 158-E is configured based on the operating system and device type of the source device from which data is retrieved and stored in each partition.

In some implementations, the backup prioritization can be assigned based on a set of user-specified criteria for performing a data archiving operation. The user can specify, for example, devices and/or data types to prioritize when performing a data archiving operation, indications as to which data files are essential and non-essential, and/or preferences in how the backup device 120 performs the data archiving operation (e.g., designated time points when data is backed up, resource allocation for performing the data archival operation, etc.). In such implementations, the backup device 120 generates the backup parameters 156 in accordance with user-specified preferences for performing the data archiving operation.

The example depicted in FIG. 1B illustrates an implementation where the backup device 120 archives data based on the source device from which data is extracted, e.g., storing data from each source device within a different assigned partition of the non-volatile storage 122. In some other implementations, however, the backup device 120 may store data to be archived using other types of data segmentation techniques. For example, the backup device 120 may configure the non-volatile storage 122 to include partitions that are each associated with a different operating system, e.g., mobile operating system, desktop operating system. In this example, data from different source devices that run the same operating system may be archived within the same partition. In another example, the backup device 120 may configure the non-volatile storage 122 to include partitions that are each associated with a different data priority identifier. In this example, essential data, e.g., data that a user indicates as being important to back up, can be archived in a single partition, whereas non-essential data, e.g., data that a user indicates as being routine, can be archived in another partition. In this regard, the backup device 120 may use different partitioning schemes to store data from multiple sources devices. In some implementations, the particular partitioning scheme used by the backup device 120 is a user-selectable feature that a user selects when initiating an archiving operation, e.g., through a user interface presented on the network device 110 and/or the backup device 120.

In some implementations, the backup device 120 is capable of operating as a server system that accesses files stored on the source devices connected over a LAN, e.g., sources devices 130a-c connected over the LAN 105, to perform full device restore operations based on the backup data 124A in the non-volatile storage. In such implementations, the backup device 120 can perform the restore operations through a direct wired connection to a source device, over a network connection to a source device over a LAN, or alternatively, by instructing and controlling the network device 110 to perform the restore operations. For example, if a main server of a LAN is unavailable or inoperable, then the backup device 120 can function as a secondary backup server by providing its stored data to source devices connected to the LAN. A user can initiate a restore operation using a touchscreen of the backup device 120. The backup device 120 can instruct the network device 110 to restore a source device, and the backup device 120 can transmit the stored data to the network device 110 for restoring the source device. The network device 110 and/or the source devices can request data stored on the backup device 120. In other instances, the backup device 120 can push instructions to perform restore operations to source devices, e.g., after obtaining approval at the source device prior to initiating the restore operation.

Additionally, the backup device 120 can run software that enables it to operate as a backup server connected over the LAN when a primary server, e.g., the network device 110, is unavailable or not operational. The backup device 120 can run and manage the same operating system, applications, services, security settings, network configurations, etc., as the primary server. For example, the backup device 120 can run in a server environment based on backup data of the primary server stored in the non-volatile storage 122. In this example, the backup data of the primary server can be used to configure the backup device 120 to operate as a server connected over the LAN. In this example, the backup device can be used to temporarily perform the operations that would be performed by the primary server, e.g., based on operating as a replacement server using the backup data for the primary server. Additionally, the backup device can be used to configure another server to replace the primary server, e.g., by performing a restoration operation on the second server based on backup data of the primary server stored on the backup device.

Figure 1C:
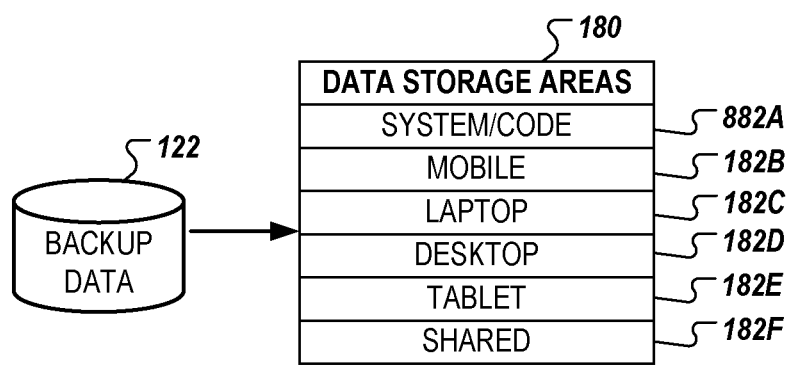
FIG. 1C is a schematic diagram that illustrates partitions on a backup device.

FIG. 1C is a diagram that illustrates data storage areas on a non-volatile storage 180 within the backup device 120. The data storage areas can be logical or physical data storage areas. For example, logical data storage areas can be, for example, separate partitions, directories, or other divisions of a data storage device. In some implementations, the source device 140 stores backup data 122 from different source devices in different data storage areas on the non-volatile storage 180 based on the operating system of the source device 150. For example, when the source device 150 is connected to the backup device 120, the source device 140 initially identifies the operating system of the source device 150 based on the USB standard device information exposed by the connection. The backup device 120 uses this device information to identify a file path for the backup data 122 that corresponds to a specified partition for the operating system within the non-volatile storage 180.

As shown in FIG. 1C, the non-volatile storage 180 may include data storage areas 182a-f for different devices or operating systems. For example, the data storage area 182a can be assigned to store executable instructions or system data for the backup device 120. The data storage areas 182b-182e may be, respectively, storage areas for different operating systems for mobile, laptop, desktop, and tablet devices, and storage area 182f can be used as a shared storage area for archiving files that can be accessed by multiple different devices.

The data storage device 160 also archives data from multiple connected source devices into assigned data storage areas for each source device. For example, each source device can be assigned an identifier, as discussed below. The backup data for different source devices may be stored in different storage areas within the storage device 160 based on an identifier for the source device. For instance, the data storage device 160 may include separate directories, each corresponding to a different host identifier and storing data from the device associated with the host identifier. As a result, multiple hose devices having the same operating system can each have data stored in a separate data storage area.

FIGS. 2A-2C are diagrams that illustrate views of an example backup device 200. FIG. 2A represents a top view of the backup device 200, FIG. 2B represents a perspective view of the backup device 200, and FIG. 2C represents a side view of the backup device 200. As shown in FIG. 2A, the backup device 200 includes an external storage module 210, a touchscreen 212, a power button 214, and device interfaces 216 and 218 on the external casing or housing 213 of the backup device 200. In some implementations, the device interface 216 is a USB interface, and the interface 218 is a power connector for receiving a power cord.

As shown in FIG. 2B, the backup device 200 includes internal hardware components such as a motherboard 220, a storage device 222, and a battery 224.

Referring now to FIG. 2A, the external storage module 210 is a memory card reader used to communicate with smart cards or memory cards such as CompactFlash, Secure Digital or Multimedia Cards. The external storage module 210 accesses a connected memory card to access files stored on the memory card. In some implementations, when the external storage module 210 detects an inserted memory card into the module, the backup device 200 may present a user interface on the touchscreen 212 to allow the user to select files to transfer to the storage device 222 from the connected memory card.

The touchscreen 212 is an electronic visual display that allows a user to provide input to the backup device 210 through a touch user interface. The user may provide input using simple touch or multi-touch gestures by touching the screen with either a special stylus or pen such as an active digitizer or using touch input. The touchscreen 212 also accepts commands from the user. As discussed below, the backup device 200 is configured to user input that indicates a variety of commands, such as selecting specific files to transfer from a source device to the backup device 210, selecting an archiving option (e.g., backup, restore, etc.), and navigating through file directories within the interface that represent the files that are stored within the storage device 222. The backup device 200 may cause documents and images to be displayed at the touchscreen 212, for example, to show users previews of documents or images through thumbnails presented through the user interface. For example, the touchscreen 212 may show the user slideshows of images within a specified file directory.

The device interface 216 allows the backup device 200 to exchange communications with a connected source device to archive data stored on the source device or transfer data stored on the storage device 222 to the connected source device. For example, in some implementations, the device interface 216 may be a USB port that allows the backup device 200 to connect to a source device using a USB cable. The device interface 216 reads the port attributes of the connected source device to determine the device type and the operating system of the connected source device. The port attributes may be queried to a device controller to create unique device identifier for the connected source device.

The device interface 216 also determines the status of the connected source device prior to any archiving processes carried out by the backup device 200. For example, the device interface 216 may receive data transmissions from the connected source device indicating whether the source device is available or unavailable to initiate a data archiving process such as a file transfer from the source device to the storage device 222.

Referring to FIG. 2B, the motherboard 220 is a printed circuit board that includes a central processing unit (CPU), random access memory (RAM), and connectors to execute the archiving operations carried out by the backup device 200. For example, the CPU of the motherboard 220 controls access to partitions of the storage device 222, initiates and terminates file processes between the source device and the backup device 200, enables the user interface to be presented to a user on the touchscreen 212, and creates computer-implemented protocols to determine whether the connected source device has been previously archived with the backup device 200. In some implementations, the motherboard and associated components are an independent computing system that can drive the archiving process.

The storage device 222 is a non-volatile data storage device such as a flash memory device or a magnetic storage device. The storage device includes different logical storage areas (e.g., drive partitions, directories, etc.) for storing archived data from the connected source device. For example, the storage device 222 may be a hard disk drive configured with partitions for various source devices or various operating systems as represented in FIG. 1C. The storage device 222 may be used by the backup device 200 to store data from multiple source devices that were separately connected to the backup device 200 at different times. The data from these devices may be from device of different device types (e.g., smartphone, tablet, laptop, etc.), and the data may be stored simultaneously within specified storage areas within the storage device 222. In some implementations, a different logical storage area, e.g., a different partition or directory, may be assigned for each source device.

In some implementations, the storage device 222 may include a shared storage area, in addition to specified storage areas for source devices. The shared area can be used for indexing, storing, synchronizing, and retrieving documents and other data stored on the storage device 222. In such implementations, the backup device 200 may use the shared storage area to more easily carry out user commands received through the user interface of the touchscreen 212. For example, the backup device 200 may store thumbnail previews and icon graphics for the user interface within the shared storage space.

In other instances, the shared storage area may be utilized for copying files between specified storage areas within the storage device 222, or from the storage device 222 to source devices. For example, if a user has archived data from two different source devices (e.g., a smartphone and a tablet) onto the backup device 200, the user may use the user interface to transfer files between the separate storage areas for each respective device by initially transferring files to the shared storage area, then to the data storage area for the other device.

The storage device 222 is also used to store drivers of multiple types of connected source devices. Drivers are transferred from the storage device 222 to the connected source device when a new source device has not been previously connected with the backup device 200.

The battery 224 is a portable rechargeable lithium-ion battery used as a power supply for the archiving operations performed by backup device 200. In some implementations, the battery 224 may be replaceable through a removable compartment in the external casing of the backup device 200 to allow use with multiple portable battery units.

In some implementations, the backup device 120 includes a daughterboard or card 224 that is physically separate from the motherboard 220. The daughterboard 224 is a printed circuit board or card configured to operate the touch screen 212. The daughterboard 224 includes a CPU and RAM to control the processes involving the touch screen 212 such as preparing and providing the user interface, receiving user input and processing the user input to initiate computer-implemented protocols in response to the user input.

In some implementations, the daughterboard 224 may be configured to operate independently from the motherboard 220, or at least perform some tasks independently, to reduce memory usage, CPU usage, and other resource usage for the processing system on the motherboard 220. By offloading touchscreen processing to the processor of the daughterboard 224, the processor of the motherboard 220 has more available processing capacity for data transfer and other archiving operations. For example, the motherboard 220 may control the data archiving operations on between the backup device and the source device, while the daughterboard 224 may process the user input identifying the files that need to be archived.

The daughterboard 224 can also allow the device to have a lower profile, e.g., to minimize the height of the device perpendicular to the touchscreen. The daughterboard 224 can be oriented parallel to the motherboard 220 and in the same plane as the motherboard 220.

Figure 3A:
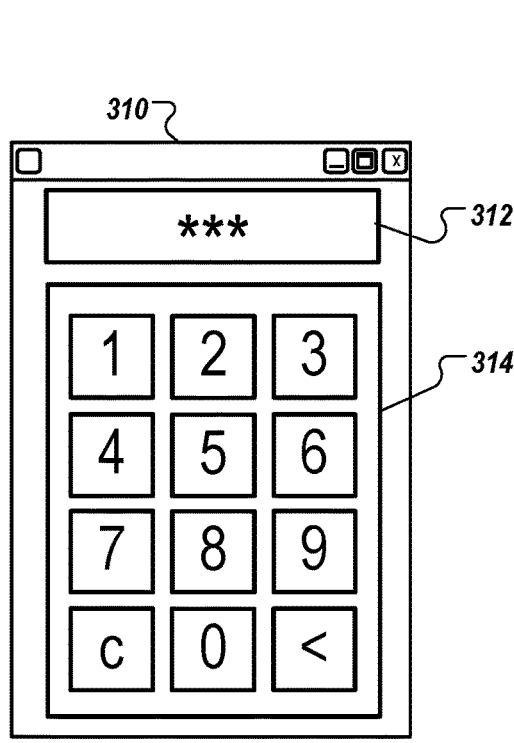
FIGS. 3A-3D are diagrams that illustrate example user interfaces.
Figure 3B:
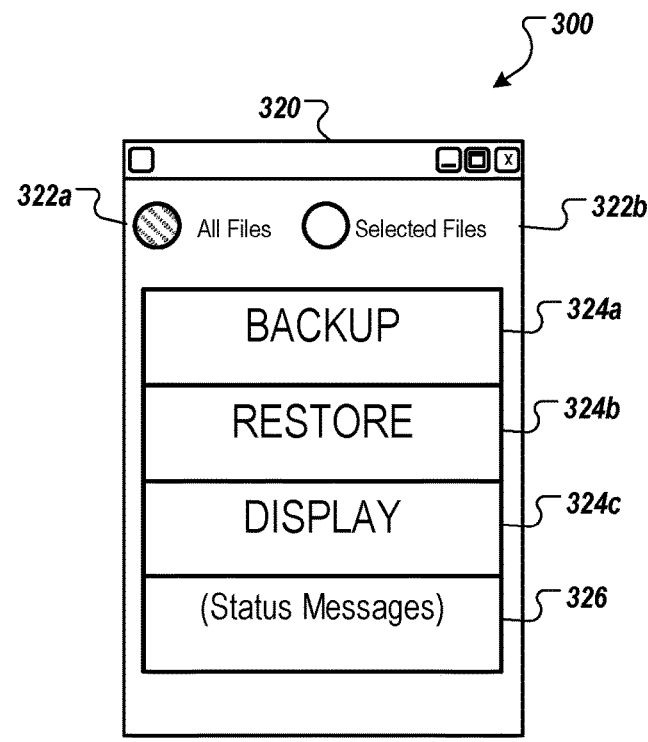
Figure 3C:
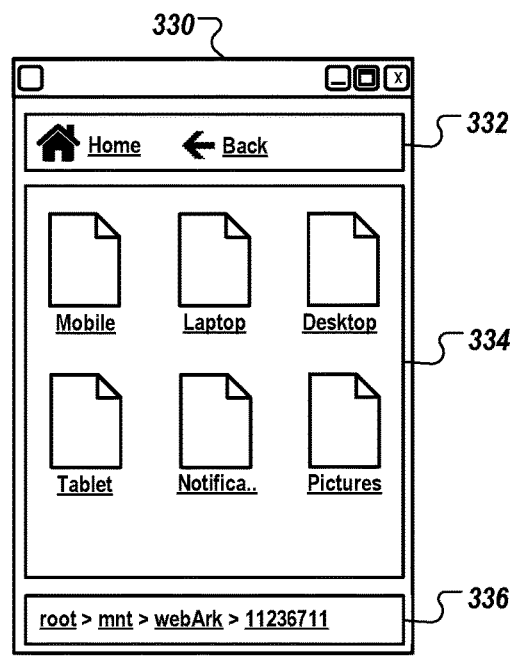
Figure 3D:
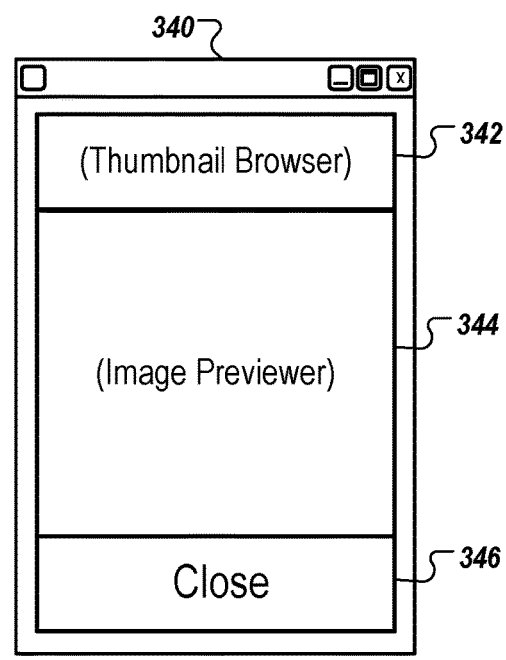

FIGS. 3A-3D are diagrams that illustrate example user interfaces that are provided by the backup device 200. Briefly, FIG. 3A illustrates an example lock screen interface 310, FIG. 3B illustrates an example archive selection interface 320, FIG. 3C illustrates and example file browser interface 330, and FIG. 3D represents file preview interface 340. The interface 300 is presented to the user on the touchscreen 212 of the backup device 200.

Referring to FIG. 3A, lock screen interface 310 includes a type display 312 and a number pad 314. The lock screen 310 allows the user to restrict access to the interface 300 by requiring the user to submit a preset passcode. The lock screen 310 is initially presented to the user when the backup device 200 is initially powered on or after it has been inactive for a certain period of time (e.g., five minutes). When a user is presented with the lock screen interface 310, the user is directed to provide an input that consists of a personal identification number that allows access to the user interface 300. The user may provide such input using the number pad 314 by providing a touch input over the displayed numbers on the touchscreen 212. The corresponding user input is indicated with displayed symbol icon on the type display 312.

Once the user successfully provides the correct personal identification number, the user may be directed to the archive selection interface 320 to specify the type of archiving process to initiate with the connected source device. The archive selection interface 320 includes two radio buttons 322a and 322b, which allow the user to specify whether all the files or only specified files will be archived, respectively. The archive selection interface 320 also includes selection buttons 324a, 324b, and 324c, which allow the user to select either the "backup", "restore", or "display" options, respectively. Finally, the archive selection interface 320 includes a status message 326, which shows any relevant information relating to an archive process such as the status of the source device (e.g., ready for archiving), the total size of the data on the connected source device, the remaining storage space available on the backup device 200, or file transfer information regarding the last archiving process with the same connected source device.

When a user selects the radio button 322b, the user may be directed to the file browser interface 330, where the user may provide selections of specific files to perform archiving operations on, or the user may view file contents of existing archived data on the backup device 200. The file browser interface 330 includes a navigation pane 332, which allows the user to between hierarchal file directories, a file selection pane 334, which displays files stored within a specified directory, and a file directory 336, which displays the current file directory of the file selection pane 334. The user may return to the archive selection interface 320 by providing an input over on "Home" button as shown in navigation pane 332. Similarly, a user may provide an input on the "Back" button to revert back to a previous screen within the interface 300. The file selection pane 334 includes views of specified files or folders stored within the file directory 336.

In some implementations, upon providing an input over an icon within the file selection pane, the user may be presented with multiple options of actions to be taken on the specified file. For example, a user may be presented with an option to change the viewing options for the icon, add the file to an archive query, manipulate the file (e.g., copy, paste, cut, rename, delete, etc.), or be directed to the file preview interface 340 to view a preview of the file. Because the backup device 200 includes its own battery, processor, memory, and operating system, the backup device 200 may operate independently of any source device. This included permitting the user to interact with the user interface and view and manipulate files when the backup device 200 is not connected to any source device.

The file preview interface 340 includes a thumbnail browser 342, which allows the user to browse thumbnails of files within a specific directory, an image previewer 344, which generates a cached representation of the file contents, and a button 346, which redirects the user to the file browser interface 330. For example, the thumbnail browser 342 may indicate a directory of specified files, and the backup device 200 may be able to provide a preview of each of the specified files on the user interface 300. In such examples, the backup device 200 may examine the files within a specified directory and determine whether the files present are capable of generating a preview thumbnail. The backup device 200 may then selectively represent only those files within the directory that may have previews. In another example, the thumbnails may be stored in a shared storage location within the storage space of the backup device 200, and the backup device 200 may initiate a computer-implemented protocol to access and display the thumbnails using a file directory mapping between the file directory and a cached directory within the shared storage space. The image previewer 344 may display an image for multiple files (e.g., text documents, images, etc.) and provide a rendering for the viewer to see. In some implementations, the user may be able to perform simple navigational commands such as zooming in or scrolling to examine the preview image.

Figure 4:
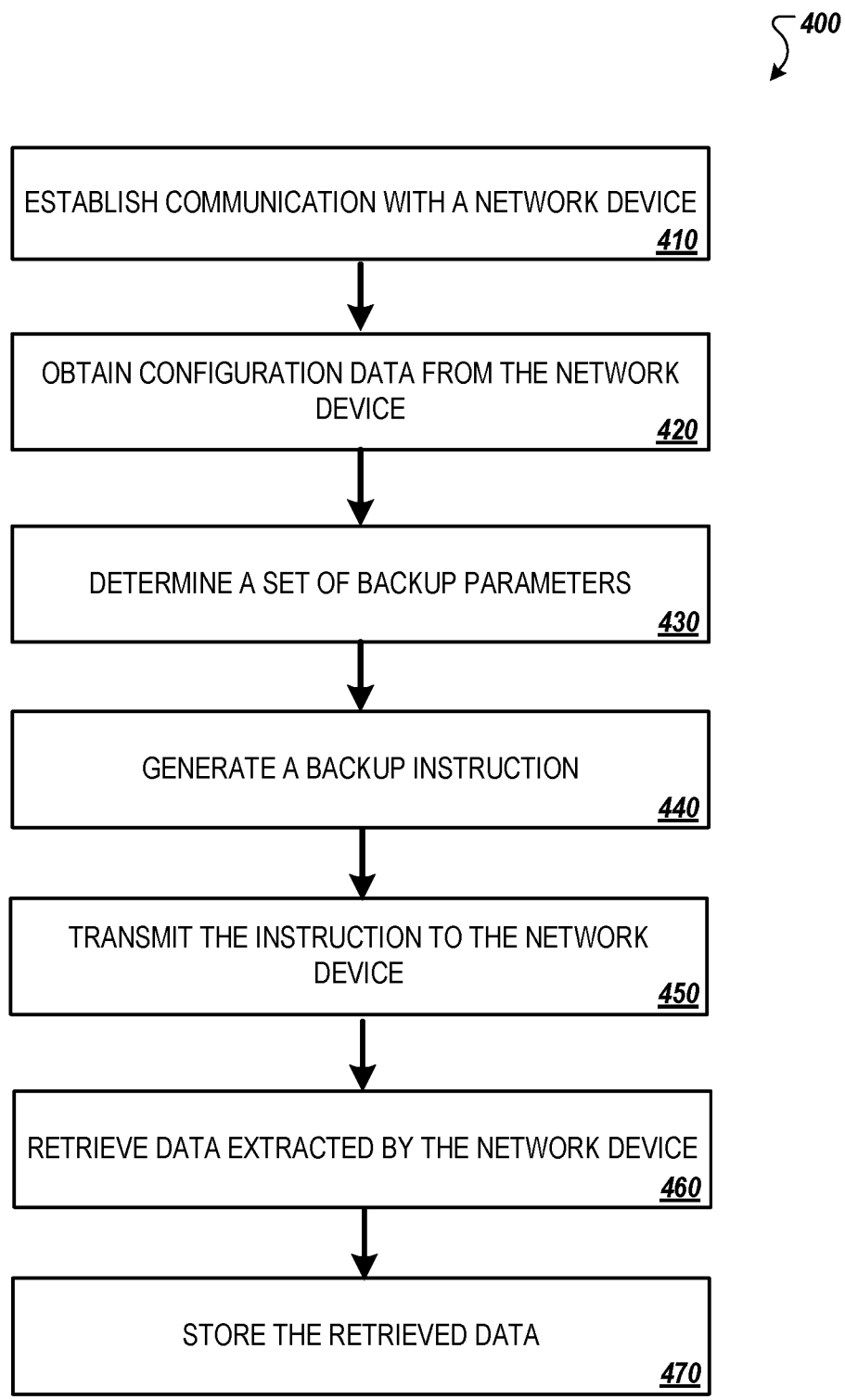
FIG. 4 is a flow diagram that illustrates an example of a process for connecting a storage device to a source device.

FIG. 4 is a flow diagram that illustrates an example of a process 400 for connecting a backup device to a source device. Briefly, the process 400 can include the operations of establishing communication with a network device (410), obtaining configuration data from the network device (420), determining a set of backup parameters (430), generating an instruction (440), transmitting the instruction of the network device (440), retrieving data extracted by the network device (460), and storing the retrieved data (470).

The process 400 is described below in reference to system 100, although other systems may be configured to perform the operations of the process 400. In one example, the operations of the process 400 can be performed by the backup device 120 in relation to an archiving operation. In another example, the operations of the process 400 can be performed by a combination of the backup device 120 and an associated device such as the network device 110.

In more detail, the process 400 can include the operation of establishing communication with a network device (410). For example, the backup device 110 establishes communication with the network device 110. The communication can be established through a wired connection, e.g., a USB connection, or a wireless connection, e.g., a proximity-based connection. Additionally, or alternatively, the communication can be established using a network-based connection, e.g., an Ethernet connection, or a Wi-Fi-based connection.

In some implementations, the network device 110 may verify the connection with the backup device 120 before establishing the connection. For instance, the network device 110 may verify a network access credential provided by the backup device 120 after connecting to the network device 110 as shown in the example depicted in FIG. 1B. As discussed above, the network access credential can be an access code provided by a user, a device identifier for the backup device 120, or other types of unique identifiers that can be used to verify the authorization of the backup device 120 to access data stored on source devices connected over the LAN 105.

The process 400 can include the operation of obtaining configuration data from the network device (420). For example, the backup device 120 can obtain configuration data 154 from the network device 110. The configuration data 124A can include network information for the LAN 105, e.g., type of network, network traffic data, IP addresses of connected source devices, MAC addresses of connected source devices, among other types of configuration data. The configuration data 124B can also identify the number of source devices connected over the LAN 105, and types of network connections associated with each of the source devices 130A-C. The configuration data 124B can also identify various types of network performance attributes associated with the LAN 105 such as the total available bandwidth, upload and/or download speeds, or network latency. Additionally, the configuration data 124B can include both present network data as well has historical network data collected over a specified period of time, e.g., network traffic data collected over the last week.

The configuration data 124B can additionally include obtain other types of data such as device configuration data for each of the source devices 130A-C. The device configuration data can specify a device type of each source device, e.g., mobile phone, network computing device, tablet computing device, an operating system running on each source device, e.g., iOS, Android, Windows, etc., and/or a type of backup to be performed for data stored on each source device, e.g., an operating system backup, file system backup, etc.

The process 400 can include the operation of determining a set of backup parameters (430). For example, the backup device 120 may generate backup parameters 156 based on the obtained configuration data 154. As depicted in FIG. 1B, the backup parameters 156 can be used to configure the non-volatile storage 122 of the backup device 120 to archive data retrieved from the source devices 122 during an archiving operation. In other examples, the backup parameters 156 can be used to process data extracted from source devices and to be archived in the non-volatile storage 122. For example, the backup parameters can include a backup prioritization that specifies an order in which data is archived from multiple source devices. The prioritization can be based on the amount of data to be backed up, the importance associated with data to be backed up, and/or the data type of each source device.

The process 400 can include the operation of generating a backup instruction (440). For example, the backup device 120 can generate the backup instruction 102 based on the backup parameters 156. The instruction 102 can include commands that cause the network device 110 to extract data from the source devices over the LAN 105. In some instances, the instruction 102 can also specify device-specific archiving operations to be performed by the network device 110 for each source device. For example, the instruction specifies an operating system backup for one source device, and a data file backup for another source device. In this example, the instruction 102 can include executable files that cause the network device 110 to perform the specified archiving operations specific to each source device.

The process 400 can include the operation of transmitting the instruction to the network device (450). For example, the backup device 110 can transmit the backup instruction 102 to the network device 110 over the communication established in step 410.

The process 400 can include the operation of retrieving data extracted by the network device (460). For example, the backup device 120 can retrieve data 104B extracted by the network device 110. In some implementations, the backup device 120 retrieves portions of the extracted data 104B while the network device 110 is extracting data from source devices over the LAN 105. For example, the backup device 120 can retrieve data packets that include portions of extracted data 104B for a source device once the network device 120 has completed extracting data for the source device, but is presently extracting data for another source device over the LAN 105. In this example, the backup device 120 retrieves extracted data concurrently as the network device 110 extracts data from other source devices.

Alternatively, in other implementations, the network device 110 stores data extracted over the LAN 105 in a temporary storage device such as the repository 112. In such implementations, the backup device 110 retrieves the extracted data from the repository 112. In one example, the network device 110 stores the extracted data 104A in the repository 112, and backup device 120 retrieves the extracted data after the network device 110 has completed the extraction operation. In another example, the backup device 110 retrieves portions of the extracted data from the repository 112 while the network device 110 performs an ongoing extraction operation. In these examples, the backup device 110 can retrieve the data as a single data transmission, a continuous stream of multiple data transmissions, or periodic stream of multiple data transmissions. In some implementations, the backup device 110 uses a particular retrieval technique based on the network attributes of the LAN 105 indicated within the configuration data 154 obtained in step 420.

The process 400 can include the operation of storing the retrieved data (470). For example, the backup device 120 stores the extracted data 122 retrieved from and/or through the network device 120 in the non-volatile storage 122. As shown in the example depicted in FIG. 1B, the backup device 120 can configure the non-volatile storage 122 according to the configuration data 154 obtained from the network device 110. For example, the backup device 120 can partition the non-volatile storage 122 so that each source device to be backed up is assigned a distinct partition within the non-volatile storage 122. Each partition can be constructed according to the device information of the assigned source device as indicated within the configuration data 154. As examples, the backup device 120 can adjust the size of the partition based on the amount of data to be backed up on the source device, the format of the partition based on the operation system running on the source device, and/or the type of data that is to be backed up, e.g., essential data, non-essential data. In some implementations, the non-volatile storage 122 can be partitioned using other types of segmenting techniques. As an example, the non-volatile storage 122 can be partitioned such that data from source devices that run the same operating system are stored in the same partition. In another example, the non-volatile storage 122 can be alternatively be partitioned according to data prioritization so that data identified as being essential is stored in the same partition whereas data identified as being non-essential is stored in another partition.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. An apparatus comprising:
one or more non-volatile data storage devices, the one or more non-volatile data storage devices having a plurality of different logical data storage areas;
one or more processors; and
machine-readable media comprising executable instructions that, when executed by the one or more processors, cause the apparatus to perform operations comprising:
 establishing communication of the apparatus with a server system connected to a local area network;
 obtaining, by the apparatus, network configuration data from the server system, the network configuration data identifying (i) one or more source devices including at least one client device connected to the server system over the local area network, and (ii) characteristics of the one or more source devices, wherein the network configuration data comprises:
  a network performance attribute for each of the one or more source devices, wherein the network performance attribute comprises at least one of a bandwidth, a data transfer speed, or a network latency;
  data indicating a present usage level of the local area network; and
  data indicating historical usage levels of the local area network over time;
 determining, by the apparatus, a set of backup parameters based on the obtained network configuration data to schedule data transfer and set transfer speeds for data transfer from the one or more source devices based on (i) the network performance attributes, (ii) the present usage level of the local area network, and (iii) the historical usage levels of the local area network to limit impact of backup operations on other traffic through the local area network;

generating, by the apparatus, one or more instructions based at least on the determined set of backup parameters, the one or more instructions specifying one or more archiving operations that, when received by the server system, cause the server system to (i) extract data from the one or more source devices over the local area network according to the determined set of backup parameters and provide the extracted data to the apparatus, and (ii) provide data stored by the server system, including an operating system, applications, and configuration information for the server system;

transmitting, by the apparatus, the one or more instructions to the server system;

receiving, by the apparatus and from the server system, (i) data extracted by the server system from the one or more source devices over the local area network in response to receiving the one or more instructions, and (ii) data stored by the server system including the operating system, applications, and configuration information for the server system;

storing, by the apparatus, the received data at the one or more non-volatile data storage devices;

configuring the apparatus, by the apparatus, to execute the operating system and applications of the server system; and operating the apparatus as a server for the local area network as a replacement for the server system while the server system is not available.

2. The apparatus of claim 1, wherein the operations further comprise:

determining to perform a restoration operation for a particular source device from among the one or more source devices;

determining that the stored data at the one or more non-volatile data storage devices includes backup data to be restored to the particular source device;

generating a second instruction based at least on the determined set of backup parameters, the second instruction specifying the restoration operation that, when received by the server system, causes the server system to (i) retrieve the backup data from the one or more non-volatile data storage devices, (ii) transmit the backup data to the particular source device over the local area network, and (iii) cause the particular source device to execute the restoration operation based on the retrieved backup data; and transmitting the second instruction to the server system.

3. The apparatus of claim 1, wherein the operations further comprise:

determining to perform a restoration operation for a particular source device from among the one or more source devices;

determining that the stored data at the one or more non-volatile data storage devices includes backup data to be restored to the particular source device;

generating a second instruction based at least on the determined set of backup parameters, the second instruction specifying the restoration operation that, when received by the particular source device, causes the particular source device to (i) retrieve the backup data from the one or more non-volatile data storage devices, and (ii) execute the restoration operation based on the retrieved backup data; and transmitting, over a direct connection with the particular source device, the second instruction to the particular source device.

4. The apparatus of claim 1, wherein storing the received data at the one or more non-volatile data storage devices further comprises:

assigning, to each of the one or more source devices, a particular logical data storage area of the one or more non-volatile data storage devices for storing data extracted by the server system from a particular source device; and storing the respective data extracted by the server system in the particular logical data storage areas assigned to each of the one or more source devices.

5. The apparatus of claim 4, wherein assigning the particular logical data storage area of the one or more non-volatile data storage devices to each of the one or more source devices comprises, for each of the one or more source devices:

determining an amount of data to be extracted by the server system; and determining a storage allocation for the particular logical data storage area of the one or more non-volatile data storage devices based on the amount of data to be extracted by the server system, the storage allocation specifying a size of the particular logical storage area of the one or more non-volatile data storage devices.

6. The apparatus of claim 4, wherein assigning the particular logical data storage area of the one or more non-volatile data storage devices to each of the one or more source devices comprises, for each of the one or more source devices:

determining operating system of the server system; and determining a storage format for the particular logical data storage area of the one or more non-volatile data storage devices based on the operating system of the server system.

7. The apparatus of claim 1, wherein:

the network configuration data for the server system identifies device types of each of the one or more source devices;

the set of backup parameters comprises a particular backup para meter that specifies a sequence by which the server system extracts the data from each of the one or more source devices over the local area network; and the operations further comprise determining the sequence by which the server system extracts the data from each of the one or more source devices over the local area network based on the device types of each of the one or more source devices.

8. The apparatus of claim 1, wherein the one or more instructions cause the server system to obtain the data from the source devices and temporarily store the obtained data from the source devices in a repository of the server system; and wherein receiving the data by the apparatus comprises retrieving the stored data from the repository of the server system.

9. The apparatus of claim 1, wherein the operations further comprise:

displaying, on a touchscreen of the apparatus, a user interface comprising user selectable controls that permit a user to indicate data to be archived using the apparatus, and receiving, through the user interface displayed on the touchscreen, user input that indicates data extracted from the one or more source devices to be archived to the one or more non-volatile data storage devices; and retrieving the data extracted by the server system from the one or more source devices comprises retrieving, from the server system, the data indicated by the user input in response to receiving the user input through the user interface displayed on the touchscreen.

10. A method performed by one or more computers, the method comprising:
establishing communication with a server system connected to a local area network;
obtaining network configuration data from the server system, the network configuration data identifying (i) multiple source devices connected to the server system over the local area network, and (ii) characteristics of the multiple source devices;
determining a set of backup parameters based on the network configuration data obtained from the server system, wherein the backup parameters specify (i) a prioritization for extracting data from the multiple source devices and (ii) partition characteristics, determined based on the characteristics of the multiple source devices, for multiple partitions to be used for storing data from the multiple source devices;
creating multiple partitions in data storage accessible to the one or more computers, in which the multiple partitions have different sizes and formats according to the partition characteristics specified by the backup parameters;
generating one or more instructions based at least on the determined set of backup parameters, the one or more instructions specifying one or more archiving operations that, when received by the server system, cause the server system to (i) extract data from each of the multiple source devices over the local area network according to the determined set of backup parameters and provide the extracted data to the one or more computers, and (ii) provide data stored by the server system, including an operating system, applications, and configuration information for the server system;
transmitting the one or more instructions to the server system, wherein the one or more instructions cause the server system to perform archiving operations for the multiple source devices that are specific to each of the multiple source devices;
receiving, from the server system, (i) data extracted by the server system from the multiple source devices over the local area network in response to receiving the one or more instructions, and (ii) data stored by the server system including the operating system, applications, and configuration information for the server system;
storing the received data in the partitions of the data storage of the one or more computers, wherein the data for the multiple source devices are stored in different partitions according to the characteristics of the multiple source devices specified by the network configuration data;
configuring the one or more computers to execute the operating system and applications of the server system; and
while the server system is not presently available over the local area network, operating the one or more computers as a server for the local area network as a replacement for the server system.

11. The method of claim 10, further comprising:
determining to perform a restoration operation for a particular source device from among the multiple source devices;
determining that the stored data at the one or more non-volatile data storage devices includes backup data to be restored to the particular source device;
generating a second instruction based at least on the determined set of backup parameters, the second instruction specifying the restoration operation that, when received by the server system, cause the server system to (i) retrieve the backup data from the one or more non-volatile data storage devices, (ii) transmit the backup data to the particular source device over the local area network, and (iii) cause the particular source device to execute the restoration operation based on the retrieved backup data; and
transmitting the instruction to the server system.

12. The method of claim 10, further comprising:
determining to perform a restoration operation for a particular source device from among the multiple source devices;
determining that the stored data at the one or more non-volatile data storage devices includes backup data to be restored to the particular source device;
generating a second instruction based at least on the determined set of backup parameters, the second instruction specifying the restoration operations that, when received by the particular source device, cause the particular source device to (i) retrieve the backup data from the one or more non-volatile data storage devices, and (ii) execute the restoration operation based on the retrieved backup data; and
transmitting, over a direct connection with the particular source device, the second instruction to the particular source device.

13. One or more non-transitory computer-readable storage devices encoded with computer program instructions that, when executed by one or more computers, cause the one or more computers to perform operations comprising:
establishing, by the one or more computers, communication with a server system connected to a local area network;
obtaining, by the one or more computers, network configuration data from the server system, the network configuration data identifying (i) one or more source devices connected to the server system over the local area network, and (ii) characteristics of the one or more source devices, wherein the network configuration data comprises:
a network performance attribute for each of the one or more source devices, wherein the network performance attribute comprises at least one of a bandwidth, a data transfer speed, or a network latency;
data indicating a present usage level of the local area network; and
data indicating historical usage levels of the local area network over time;
determining, by the one or more computers, a set of backup parameters based on the obtained network configuration data to schedule data transfer and set transfer speeds for data transfer from the one or more source devices based on (i) the network performance attributes, (ii) the present usage level of the local area network, and (iii) the historical usage levels of the local area network to limit impact of backup operations on other traffic through the local area network;
generating, by the one or more computers, one or more instructions based at least on the determined set of backup parameters, the one or more instructions specifying one or more archiving operations that, when received by the server system, cause the server system to (i) extract data from the one or more source devices over the local area network according to the determined set of backup parameters and provide the extracted data to the one or more computers, and (ii) provide data stored by the server system, including an operating system, applications, and configuration information for the server system;

transmitting the one or more instructions to the server system;

receiving, by the one or more computers and from the server system, (i) data extracted by the server system from the one or more source devices over the local area network in response to receiving the instruction, and (ii) data stored by the server system including the operating system, applications, and configuration information for the server system;

storing, by the one or more computers, the received data using one or more non-volatile data storage devices;

configuring the one or more computers to execute the operating system and applications of the server system; and operating the one or more computers as a server for the local area network based on the stored operating system, applications, and configuration information stored in the one or more non-volatile data storage devices such that the one or more computers act as a replacement for the server system to devices connected to the local area network while the server system is not available.

14. The one or more non-transitory computer-readable storage devices of claim 13, wherein the operations further comprise:

determining to perform a restoration operation for a particular source device from among the one or more source devices;

determining that the stored data at the one or more non-volatile data storage devices includes backup data to be restored to the particular source device;

generating a second instruction based at least on the determined set of backup parameters, the second instruction specifying the restoration operation that, when received by the server system, cause the server system to (i) retrieve the backup data from the one or more non-volatile data storage devices, (ii) transmit the backup data to the particular source device over the local area network, and (iii) cause the particular source device to execute the restoration operation based on the retrieved backup data; and transmitting the instruction to the server system.

15. The one or more non-transitory computer-readable storage devices of claim 13, wherein the operations further comprise:

determining to perform a restoration operation for a particular source device from among the one or more source devices;

determining that the stored data at the one or more non-volatile data storage devices includes backup data to be restored the particular source device;

generating a second instruction based at least on the determined set of backup parameters, the second instruction specifying the restoration operations that, when received by the particular source device, cause the particular source device to (i) retrieve the backup data from the one or more non-volatile data storage devices, and (ii) execute the restoration operation based on the retrieved backup data; and transmitting, over a direct connection with the particular source device, the second instruction to the particular source device.

16. The apparatus of claim 1, wherein the one or more instructions comprise one or more executable files that the apparatus provides to the server system, the one or more executable files being configured to cause the server system to perform archiving operations specific to each of the one or more source devices identified by the network configuration data from the server system.

17. The apparatus of claim 1, wherein the one or more source devices comprise multiple source devices.

18. The method of claim 10, wherein the server system comprises a web server or an application server, and wherein operating the one or more computers as a server for the local area network as a replacement for the server system while the server system is not available comprises operating the one or more computers as a web server or an application server in place of the server system.

19. The apparatus of claim 1, wherein the apparatus is a portable, self-contained backup device provides both data backup and server replacement capabilities, wherein the backup device further comprises:

a battery configured to power the apparatus;

a touchscreen display; and a external housing, wherein battery, the touchscreen display, the one or more non-volatile data storage devices, the one or more processors, and the machine-readable media are housed in the external housing.

20. The apparatus of claim 19, further comprising memory card reader configured to receive an external memory card;

wherein the apparatus is configured to:

detect insertion of a memory card into the memory card reader; and in response to detecting insertion of the memory card, present, on the touchscreen display, a user interface enabling a user to select files to transfer.

* * * * *

UNITED STATES PATENT AND TRADEMARK OFFICE
CERTIFICATE OF CORRECTION

PATENT NO. : 10,545,834 B1  
APPLICATION NO. : 15/910746  
DATED : January 28, 2020  
INVENTOR(S) : June B. Smith Page 1 of 1

It is certified that error appears in the above-identified patent and that said Letters Patent is hereby corrected as shown below:

In the Claims

Column 26, Line 40, Claim 7, please delete "para meter" and insert therefor -- parameter --; and Column 29, Line 21, Claim 13, please delete "stored"

Signed and Sealed this
Twenty-fourth Day of March, 2020

Andrei Iancu
*Director of the United States Patent and Trademark Office*